United States Patent Office 2,853,508
Patented Sept. 23, 1958

2,853,508

DIPHENYL PHOSPHITE

Ingenuin Heckenbleikner, Clarksburg, and Herbert W. Sloan, Lee, Mass., assignors, by mesne assignments, to Hooker Chemical Corporation, Niagara Falls, N. Y., a corporation of New York No Drawing. Application February 15, 1957
Serial No. 640,326

4 Claims. (Cl. 260—461)

This invention relates to the preparation of diphenyl phosphite.

It is known to prepare diphenyl phosphite by reacting ethyl diphenyl phosphite with hydrogen chloride to form the desired diphenyl phosphite and ethyl chloride as a by-product according to the equation

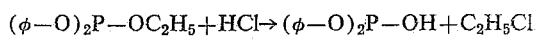
$(\phi-O)_2P-OC_2H_5 + HCl \rightarrow (\phi-O)_2P-OH + C_2H_5Cl$

This method of preparation has the disadvantage that the starting phosphite is fairly expensive.

It is an object of the present invention to prepare diphenyl phosphite by a more economical process than that employed in the prior art.

A further object is to prepare diphenyl phosphite from triphenyl phosphite.

A more specific object is to accelerate the formation of diphenyl phosphite from triphenyl phosphite.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting triphenyl phosphite with an equimolar amount of water. To accelerate the reaction sufficient phenol should be added to render the reaction mixture homogeneous.

The proportion of water to triphenyl phosphite is critical. If more than one mol of water is added per mol of triphenyl phosphite, then the hydrolysis will go too far and in addition to diphenyl phosphite there will be formed monophenyl phosphite. Hence, an excess of water is avoided. If less than one mol of water is employed per mol of triphenyl phosphite, the yield of the diphenyl phosphite is reduced. Hence, normally substantially one mol of water will be used although a lesser amount, e. g., 0.75 mol per mol of triphenyl phosphite can be employed with a corresponding reduction in yield. The use of such lesser amount of water does not result in the formation of undesired products, however, and in this respect is distinguished from the use of an excess of water.

Water and triphenyl phosphite are not normally miscible with each other. Hence, the reaction is relatively slow starting. By adding a sufficient amount of phenol, these two substances can be rendered miscible and the reaction accelerated. As phenol is a by-product of the reaction, the introduction of phenol at the start does not introduce an additional impurity. Since phenol is one of the products formed, it is surprising that its deliberate addition actually accelerates the reaction since by the law of mass action it would be expected that the addition of phenol would repress the reaction.

The upper limit on the amount of phenol added is not critical but normally no advantage is obtained by using more phenol than is required for complete miscibility of the water and triphenyl phosphite. Generally, when the phenol is used, it is employed in an amount between 0.20 and 0.5 mol per mol of triphenyl phosphite.

The reaction between the triphenyl phosphite and water can be carried out readily at room temperature. Generally, a temperature within the range of 15–50° C. has been found convenient.

Example 1

Triphenyl phosphite _____ 930 parts (3 mols).
Phenol _____ 70 parts (0.74 mol).
Water _____ 54 parts (3 mols).

18 parts of the water were added to the 70 parts of phenol. This solution was added over 30 minutes to the 930 parts of triphenyl phosphite with stirring at a temperature of 25 to 50° C. The solution was homogeneous throughout the addition. External cooling was necessary to maintain the temperature within the specific limits. After all of the phenol-water solution had been added, the remaining 36 parts of water were added and the reaction allowed to continue for an additional 30 minutes.

The mixture was then stripped of phenol at 10 to 15 mm. pressure. The stripping was stopped at a final temperature of 160° C. Phenol recovered amounted to 342 parts which after subtraction of the 70 parts of phenol added to the reaction mixture amounted to a yield of 97% of theoretical. The clear liquid remaining after removal of the phenol was cooled to 50° C., treated with 10 parts of sodium carbonate and filtered. The filtrate was distilled at 135 to 140° C. at 1 to 2 mm. to yield diphenyl phosphite $n_D^{25}=1.55638$ and $D_{15}^{25}=1.224$ in a yield of 97% of theoretical.

Example 2

54 parts of water were added over a period of 30 minutes to 930 parts of triphenyl phosphite with stirring at a temperature maintained between 25 and 50° C. After all of the water was added, the reaction was allowed to continue for an additional 30 minutes. The phenol formed was recovered as in Example 1 in an amount of 95% of theoretical. The diphenyl phosphite was purified and recovered as in Example 1 in a yield of 95%.

While the above examples illustrate batch operation, the process can also be carried out in continuous fashion. For example, water, phenol and triphenyl phosphite in the ratio of one mol of water dissolved in ⅓ mol of phenol and one mol of triphenyl phosphite can be continuously mixed and passed through an elongated tube maintained at 25 to 50° C. for 10–20 minutes and then the phenol removed and diphenyl phosphite recovered as in Example 1.

We claim:

1. A process of preparing diphenyl phosphite comprising reacting triphenyl phosphite with about 0.75 to 1 mol of water per mol of triphenyl phosphite and in the presence of sufficient phenol to at all times maintain the triphenyl phosphite and water completely miscible.

2. A process according to claim 1 wherein the reaction is carried out at 15 to 50° C.

3. A process according to claim 1 wherein the water is used in an amount of 1 mol per mole of triphenyl phosphite.

4. A process according to claim 3 wherein the reaction is carried out at 15 to 50° C.

References Cited in the file of this patent

UNITED STATES PATENTS 2,272,193     Fisher et al. _____ Feb. 10, 1942

OTHER REFERENCES

Chemical Abstracts, vol. 8, p. 2551 (1914).
Organophosphorus Compounds, Kosolapoff, John Wiley & Sons, Inc., New York (1950), page 188.